UNITED STATES PATENT OFFICE.

THOMAS BROWN, OF SALT LAKE CITY, UTAH.

AUTOMOBILE-POLISH, (COMPOSITION.)

1,392,477. Specification of Letters Patent. Patented Oct. 4, 1921.

No Drawing. Application filed February 3, 1921. Serial No. 442,166.

*To all whom it may concern:*

Be it known that I, THOMAS BROWN, citizen of the United States, residing at Salt Lake City, in the county of Salt Lake and State of Utah, have invented certain new and useful Improvements in Automobile-Polish, (Composition,) of which the following is a specification, reference being had therein to the accompanying drawings.

This invention relates to an automobile polish, and has for its object the production of a polish that is relatively simple to produce, yet, which will give the greatest satisfaction as to results, without the least injury to the surface or object polished.

With this and other objects in view, my invention comprises a careful soaking in water of 3 ounces of soap and $2\frac{1}{2}$ ounces of beeswax. Then dissolve $2\frac{1}{2}$ ounces of powdered gum shellac in 4 ounces of wood alcohol. Then mix all together adding 4 ounces of sperm oil, and then stirring until thoroughly blended or mixed, resulting in the forming of a paste.

This composition of mine produces a fine polish and also preserves the paint on automobiles.

It is preferably applied with a cloth and polished with cotton flannel or chamois skin.

For producing a pound, or 16 ounces of polish I use:

Water.
3 ounces of castile soap.
$2\frac{1}{2}$ ounces of beeswax.
$2\frac{1}{2}$ ounces of powdered gum shellac.
4 ounces of wood alcohol.
4 ounces of sperm oil.

What I claim is:

1. A polish composition comprising water, beeswax, soap, shellac, alcohol and oil.

2. A polish composition comprising water, castile soap, beeswax, powdered gum shellac, wood alcohol and sperm oil.

3. As a new article of manufacture, a polish composition comprising water, 3 ounces castile soap, $2\frac{1}{2}$ ounces beeswax, $2\frac{1}{2}$ ounces of powdered gum shellac, 4 ounces of wood alcohol and 4 ounces of sperm oil dissolved and thoroughly mixed, producing a composition of 16 ounces of polish paste, substantially as described.

In testimony whereof I hereunto affix my signature.

THOMAS BROWN.